United States Patent
Ueno (10) Patent No.: US 12,202,235 B2
(45) Date of Patent: Jan. 21, 2025

(54) DECORATIVE SHEET AND DECORATIVE MATERIAL USING SAME

(71) Applicant: Dai Nippon Printing Co., Ltd., Tokyo (JP)

(72) Inventor: Masanori Ueno, Tokyo (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 0 days.

(21) Appl. No.: 16/650,564

(22) PCT Filed: Sep. 27, 2018

(86) PCT No.: PCT/JP2018/035838
§ 371 (c)(1),
(2) Date: Mar. 25, 2020

(87) PCT Pub. No.: WO2019/065800
PCT Pub. Date: Apr. 4, 2019

(65) Prior Publication Data
US 2020/0324533 A1    Oct. 15, 2020

(30) Foreign Application Priority Data
Sep. 27, 2017  (JP) ................ 2017-187134

(51) Int. Cl.
| | | |
|---|---|---|
| B32B 27/20 | (2006.01) | |
| B32B 7/12 | (2006.01) | |
| B32B 15/085 | (2006.01) | |
| B32B 15/18 | (2006.01) | |
| B32B 27/08 | (2006.01) | |
| B32B 27/32 | (2006.01) | |
| B41M 5/50 | (2006.01) | |

(52) U.S. Cl.
CPC ........... *B32B 27/20* (2013.01); *B32B 7/12* (2013.01); *B32B 15/085* (2013.01); *B32B 15/18* (2013.01); *B32B 27/08* (2013.01); *B32B 27/32* (2013.01); *B41M 5/502* (2013.01); *B32B 2255/10* (2013.01); *B32B 2255/26* (2013.01); *B32B 2307/412* (2013.01); *B32B 2307/416* (2013.01); *B32B 2451/00* (2013.01); *B32B 2605/003* (2013.01)

(58) Field of Classification Search
None
See application file for complete search history.

(56) References Cited

U.S. PATENT DOCUMENTS

| | | | |
|---|---|---|---|
| 5,846,306 A | 12/1998 | Kubota et al. | |
| 2004/0076804 A1* | 4/2004 | Kijima | B32B 27/32 428/195.1 |
| 2014/0018495 A1* | 1/2014 | Saitou | C09D 175/14 524/590 |
| 2014/0248473 A1* | 9/2014 | Makuta | C09D 11/101 427/514 |
| 2015/0376412 A1 | 12/2015 | Harada et al. | |
| 2016/0024327 A1* | 1/2016 | Ookawa | C09D 133/00 523/458 |
| 2018/0022076 A1 | 1/2018 | Ueno et al. | |

FOREIGN PATENT DOCUMENTS

| | | |
|---|---|---|
| JP | H10-120956 A | 5/1998 |
| JP | 2000-334892 A | 12/2000 |
| JP | 2007-168176 A | 7/2007 |
| JP | 2010-089441 A | 4/2010 |
| JP | 2012-82602 A | 4/2012 |
| JP | 2014-172197 A | 9/2014 |
| JP | 2014-184613 A | 10/2014 |
| JP | 2015-061908 A | 4/2015 |
| JP | 2016-168713 A | 9/2016 |
| JP | 6111559 B2 | 4/2017 |
| SG | 192281 A1 | 9/2013 |
| WO | 2016/125906 A1 | 8/2016 |
| WO | 2016/125907 A1 | 8/2016 |

OTHER PUBLICATIONS

Satoshi et al., JP2016168713(A), Sep. 23, 2016 (Machine translation) (Year: 2016).*
Supplementary European Search Report mailed Sep. 13, 2021, issued for European Patent Application No. 18861768.2.
International Search Report mailed Dec. 25, 2018, issued for PCT/JP2018/035838.
Official communication dated Feb. 20, 2023, issued in KR application 10-2020-7011641 and English translation thereof.
Office Action mailed Nov. 28, 2022, issued for IN202047017468.

* cited by examiner

*Primary Examiner* — Cheng Yuan Huang
(74) *Attorney, Agent, or Firm* — Locke Lord LLP (57) ABSTRACT

There is provided a decorative sheet which has excellent heat-shielding properties and excellent substrate-concealing properties and which enables easy adjustment of a dark color tone. The decorative sheet includes an infrared-reflective substrate, and a decorative layer disposed on the substrate and including a solid printing layer and a picture layer, wherein the solid printing layer contains an infrared-transparent or infrared-reflective inorganic pigment and a binder resin, and the picture layer contains at least three compounds selected from the organic pigment group consisting of a quinacridone, an isoindolinone, a nickel azo complex and a phthalocyanine, and a binder resin.

13 Claims, 1 Drawing Sheet

DECORATIVE SHEET AND DECORATIVE MATERIAL USING SAME

TECHNICAL FIELD

The present invention relates to a decorative sheet and to a decorative material using the sheet.

BACKGROUND ART

A laminate consisting of a base (adherend), such as a metal member, a resin member or a wood member, and a decorative sheet which is attached to the base to enhance the design, has been proposed for use in an architectural member or structure such as a floor, a wall, a window, a door, a handrail, a fence, a railing or floor grates. Such a laminate, consisting of a base (adherend) and a decorative sheet attached to the base, will be hereinafter referred to as a "decorative material".

In order for a decorative sheet to have a premium feel, the decorative sheet is sometimes prepared in a dark color. In this case, carbon black, which is a common black pigment, is generally used to form a picture.

However, when a decorative sheet containing carbon black is used in a place where the sheet receives a large amount of sunlight, the carbon black will absorb infrared light, thereby raising the temperature of the decorative sheet. This may result in problems such as deformation of the decorative sheet, delamination between an adherend and the decorative sheet, etc. Thus, a decorative sheet using carbon black is insufficient in the heat-shielding properties.

In order to solve the problem of heat-shielding properties, a technique as disclosed e.g. in PTL 1 has been proposed.

CITATION LIST

Patent Literature

PTL 1: Japanese Patent No. 6111559

SUMMARY OF INVENTION

Technical Problem

PLT 1 has proposed a heat-shielding decorative sheet including a colored film containing an infrared-reflective pigment such as titanium oxide, and a dark-colored pictorial pattern layer which has been formed on the colored film by using an infrared-transparent black pigment composed of an azomethine-azo pigment.

While the azomethine-azo pigment used in PLT 1 has a high absorptance in the visible light band of 380 to 780 nm and thus is black-colored, it has a low absorptance in the infrared band, particularly a band of 780 to 2500 nm highly contributing to temperature rise, and can therefore reduce absorption of infrared light. Therefore, infrared light that has entered the pictorial pattern layer passes through the pictorial pattern layer, reflects from the surface of the infrared-reflective colored film lying behind the pictorial pattern layer, and again passes through the pictorial pattern layer and is returned to the air. Thus, the decorative sheet has relatively good heat-shielding properties. However, the decorative sheet has the problem that due to insufficient concealing properties of the azomethine-azo pigment, the tint of the colored film as a substrate can be seen through the pictorial pattern layer. The concealing properties of the decorative sheet may be improved to some extent by increasing the thickness of the pictorial pattern layer or by using the azomethine-azo pigment in a large amount; however, this may result in a worsening of printability such as blocking or back-trapping, weatherability, etc.

In addition, the use of the azomethine-azo pigment in exhibiting a dark-colored pictorial pattern has the problems that because of the weak coloring power of the azomethine-azo pigment, it is difficult to adjust the color tone of the pictorial pattern, and that the weatherability of the pattern is poor.

The present invention has been made in the above situation. It is therefore an object of the present invention to provide a decorative sheet which has excellent heat-shielding properties and excellent substrate-concealing properties and which enables easy adjustment of a dark color tone, and to provide a decorative material using the sheet.

Solution to Problem

In order to solve the above problems, the present invention provides the following products [1] and [2].

[1] A decorative sheet including an infrared-reflective substrate, and a decorative layer disposed on the substrate and including a solid printing layer and a picture layer, wherein the solid printing layer contains an infrared-transparent or infrared-reflective inorganic pigment and a binder resin, and the picture layer contains at least three compounds selected from the organic pigment group consisting of a quinacridone, an isoindolinone, a nickel azo complex and a phthalocyanine, and a binder resin.

[2] A decorative material including an adherend and the decorative sheet described in [1] above.

Advantageous Effects of Invention

According to the present invention, it is possible to provide a decorative sheet which has excellent heat-shielding properties and substrate-concealing properties and which enables easy adjustment of a dark color tone, and to provide a decorative material using the sheet.

DESCRIPTION OF EMBODIMENTS

[Decorative Sheet]

The decorative sheet of the present invention includes an infrared-reflective substrate, and a decorative layer disposed on the substrate and including a solid printing layer and a picture layer, wherein the solid printing layer contains an infrared-transparent or infrared-reflective inorganic pigment and a binder resin, and the picture layer contains at least three compounds selected from the organic pigment group consisting of a quinacridone, an isoindolinone, a nickel azo complex and a phthalocyanine, and a binder resin.

As used herein, infrared (light) refers to the so-called "near-infrared (light)" having a wavelength of 780 to 2500 nm.

Figure 1:
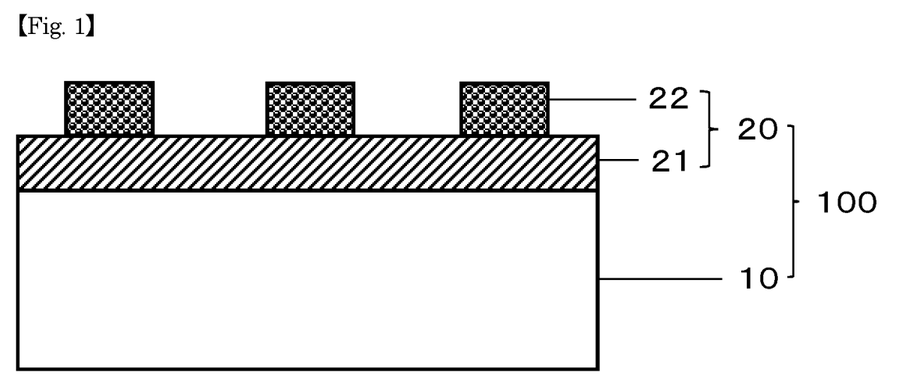
FIG. 1 is a cross-sectional view illustrating an embodiment of a decorative sheet according to the present invention.
Figure 2:
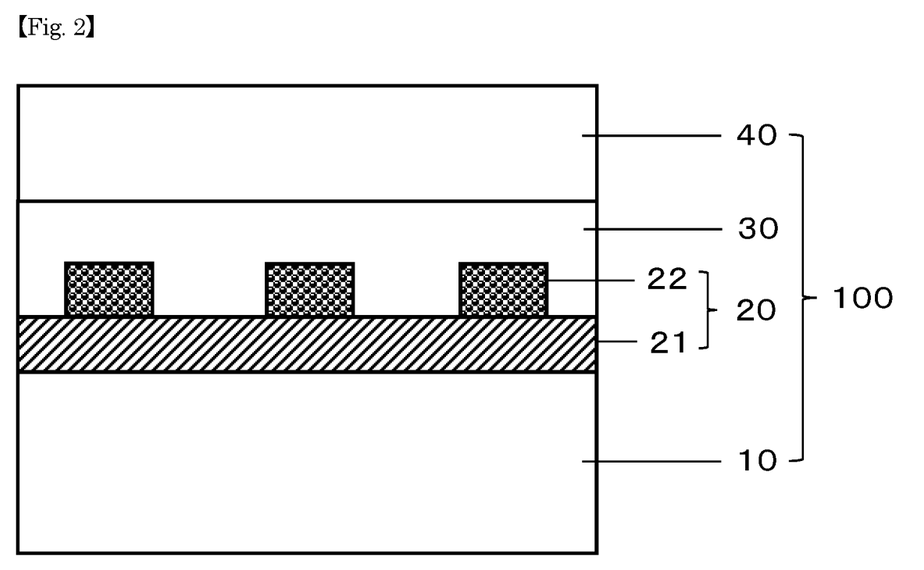
FIG. 2 is a cross-sectional view illustrating another embodiment of the decorative sheet according to the present invention.

FIGS. 1 and 2 are cross-sectional views showing decorative sheets 100 according to different embodiments.

The decorative sheets 100 of FIGS. 1 and 2 each include an infrared-reflective substrate 10, and a decorative layer 20 disposed on the substrate 10 and including a solid printing layer 21 and a picture layer 22. The decorative sheet 100 of FIG. 2 also includes a transparent resin layer 30 and a surface protective layer 40 on the decorative layer 20.

<Infrared-Reflective Substrate>

The infrared-reflective substrate may be, for example, one which contains a binder resin and an infrared-reflective pigment. The "infrared-reflective substrate" hereinafter may sometimes be referred to simply as the "substrate".

A thermoplastic resin, such as a polyolefin resin, a polyester resin, a polycarbonate resin, an acrylonitrile-butadiene-styrene resin (hereinafter also referred to as an "ABS resin"), an acrylic resin or a vinyl chloride resin, is preferably used as the binder resin.

Among them, a polyolefin resin, a vinyl chloride resin, a polyester resin, a polycarbonate resin and an ABS resin are preferred from the viewpoint of obtaining superior weatherability, surface properties such as scratch resistance, and processability e.g. in wrapping, and a polyolefin resin and a vinyl chloride resin are more preferred from the viewpoint of processability.

There is no particular limitation on the polyolefin resin. Examples of the polyolefin resin include polyethylene (low-density, medium-density, high-density), polypropylene, polymethylpentene, polybutene, an ethylene-propylene copolymer, a propylene-butene copolymer, an ethylene-vinyl acetate copolymer, an ethylene-acrylic acid copolymer, an ethylene-propylene-butene copolymer, and a polyolefin-based thermoplastic elastomer. Among them, polyethylene (low-density, medium-density, high-density), polypropylene, an ethylene-propylene copolymer and a propylene-butene copolymer are preferred from the viewpoint of obtaining superior weatherability and surface properties such as scratch resistance.

The vinyl chloride resin preferably is one having a degree of polymerization of 650 to 3500. The vinyl chloride resin is preferably used together with a plasticizer. Examples of preferable plasticizers include a trialkyl trimellitate such as trioctyl trimellitate or tridecyl trimellitate, an oligoester obtained from adipic acid and an alkylene glycol, which may be terminally modified with an alkanol or with an alkane or alkene acid, and a phthalic acid ester having an alkyl group with 10 or more carbon atoms, such as diundecyl phthalate (DUP).

Examples of the infrared-reflective pigment include a composite oxide containing manganese and at least one metal element other than manganese (hereinafter sometimes referred to as the "manganese-containing composite oxide"), a metal pigment, and an inorganic pigment such as a white pigment. Among them, a white pigment is preferred in that it can easily adjust the hue of the decorative layer. A white pigment is preferred also for its little absorption of infrared light.

The white pigment can be exemplified by titanium oxide, while the other inorganic pigment can be exemplified by iron oxide and zinc oxide. The metal pigment can be exemplified by aluminum, silver and brass. Specific examples of the manganese-containing composite oxide will be described later with reference to the below-described embodiment of the solid printing layer.

From the viewpoint of increasing the infrared reflectance, the content of the infrared-reflective pigment in the substrate is preferably not less than 1 part by mass, more preferably not less than 3 parts by mass, even more preferably not less than 5 parts by mass based on 100 parts by mass of the binder resin. From the viewpoint of moldability of the decorative sheet, the upper limit is preferably 50 parts by mass or less, more preferably 40 parts by mass or less, even more preferably 30 parts by mass or less, and still more preferably 20 parts by mass or less.

The substrate may also contain a pigment other than the infrared-reflective pigment as long as the effect of the present invention is not impaired.

The substrate may optionally contain an additive. Examples of the additive include a flame retardant such as magnesium hydroxide, an antioxidant, a lubricant, a foaming agent, an antioxidant, an ultraviolet absorber, and a light stabilizer. There is no particular limitation on the amount of the additive, and it may be appropriately set depending on, for example, the required characteristics.

There is no particular limitation on the ultraviolet absorber to be used for the substrate. Examples of the ultraviolet absorber include a benzotriazole ultraviolet absorber, a benzophenone ultraviolet absorber, and a triazine ultraviolet absorber.

A hindered amine light stabilizer, for example, is preferably used as the light stabilizer. In particular, a reactive group-containing hindered amine light stabilizer having a functional group with an ethylenic double bond, such as a (meth)acryloyl group, a vinyl group or an allyl group, can be preferably used.

Examples of preferable hindered amine light stabilizers include a hindered amine light stabilizer having in the molecule a (meth)acryloyl group which is an ethylenically unsaturated group, such as 2,2,6,6-tetramethyl-4-piperidyl (meth)acrylate or 1,2,2,6,6-pentamethyl-4-piperidyl (meth)acrylate; a hindered amine light stabilizer derived from an organic acid, such as 2,2,6,6-tetramethyl-4-piperidyl benzoate or 4-benzoyloxy-2,2,6,6-tetramethyl piperidine; a polycondensation product hindered amine light stabilizer such as the polycondensation product of 1-(2-hydroxyethyl)-2,2,6,6-tetramethyl-4-piperidinol and diethyl succinate or the polycondensation product of 1,6-bis(2,2,6,6-tetramethyl-4-piperidylamino) hexane and 2,4-dichloro-6-morpholino-s-triazine; and 1,5,8,12-tetrakis [2,4-bis (N-butyl-N-(2,2,6,6-tetramethyl-4-piperidyl)amino)-s-tiazin-6-yl]-1,5,8,12-tetraazadodecane, 1,5,8,12-tetrakis [2,4-bis (N-butyl-N-(1,2,2,6,6-pentamethyl-4-piperidypamino)-s-tiazin-6-yl]-1,5,8,12-tetraazadodecane, etc.

The content of the ultraviolet absorber in the substrate is preferably not less than 0.1 parts by mass, more preferably not less than 0.2 parts by mass, and even more preferably not less than 0.3 parts by mass based on 100 parts by mass of the binder resin. The upper limit is preferably 5 parts by mass or less, more preferably 3 parts by mass or less, and even more preferably 2 parts by mass or less.

The content of the light stabilizer in the substrate is preferably not less than 0.5 parts by mass, more preferably not less than 1 part by mass, even more preferably not less than 3 parts by mass based on 100 parts by mass of the binder resin. The upper limit is preferably 10 parts by mass or less, more preferably 8 parts by mass or less, and even more preferably 6 parts by mass or less.

When the content of the ultraviolet absorber or the light stabilizer in the substrate lies within the above range, each additive is unlikely to bleed out and can therefore achieve a full effect.

The substrate may be of a single-layer structure or of a multi-layer structure composed of two or more layers of the same type or different types.

The thickness of the substrate is preferably not less than 20 μm, more preferably not less than 30 μm, and even more preferably not less than 40 μm from the viewpoint of a balance between ease of handling and strength. The upper limit is preferably 200 μm or less, more preferably 160 μm or less, and even more preferably 100 μm or less.

In order to enhance adhesion of the substrate with another layer, such as the decorative layer constituting the decorative sheet, or with an adherend, one or both surfaces of the substrate may be subjected to a surface treatment such as a physical surface treatment using, for example, an oxidation method or a surface-roughening method, or a chemical surface treatment.

The oxidation method is exemplified by a corona discharge treatment, a chromium oxidation treatment, a flame treatment, a hot-air treatment, and an ozone/ultraviolet light treatment. The surface-roughening method is exemplified by a sandblast method and a solvent treatment method. Such a surface treatment method may be appropriately selected depending on the type of the substrate; however, in general, the corona discharge treatment method is preferably used in view of, for example, the effect and the operability of the surface treatment.

In order to enhance the interlayer adhesion between the substrate and another layer or enhance adhesion of the substrate with an adherend, the substrate may be subjected to a treatment to form a primer layer or a backside primer layer on the substrate. Such primer layers will be described later.

The average of the spectral reflectivity values of the substrate, which are measured in the wavelength range of 780 to 2500 nm according to JIS K5602:2008, is preferably not less than 30%, more preferably not less than 35%.

<Decorative Layer>

The decorative sheet 100 of the present invention includes the substrate 10, and the decorative layer 20 disposed on the substrate 10 and including the solid printing layer 21 and the picture layer 22.

<<Solid Printing Layer>>

The solid printing layer contains an infrared-transparent or infrared-reflective inorganic pigment and a binder resin.

The inclusion of the infrared-transparent or infrared-reflective inorganic pigment in the solid printing layer can conceal the tint of the substrate and enhance the design. From the viewpoint of exhibiting a dark-colored design with the decorative layer, it is important to conceal the tint of the substrate especially when the substrate contains a white pigment such as titanium oxide. In contrast, an organic pigment, such as an azomethine-azo pigment as described in PLT 1, cannot conceal the tint of the substrate.

The dark color herein refers to a darkish color having a low brightness and a low saturation, such as dark gray, dark green, dark blue, black, dark purple, dark red, or blown.

The infrared-transparent or infrared-reflective inorganic pigment preferably includes at least one compound selected from iron oxide and a composite oxide containing manganese and at least one metal element other than manganese. The manganese-containing composite oxide and iron oxide are preferred in that they are dark-colored pigments and have excellent concealing properties. Iron oxide is preferred in that it is less infrared-absorptive than the manganese-containing composite oxide.

Iron oxide is an infrared-transparent inorganic pigment.

The iron oxide includes black iron oxide represented by the compositional formula $Fe_3O_4$, yellow iron oxide represented by the compositional formula FeOOH, and red iron oxide represented by the compositional formula $Fe_2O_3$. One, or two or more of these oxides can be used. It is preferred to use a combination of yellow iron oxide represented by the compositional formula FeOOH and red iron oxide represented by the compositional formula $Fe_2O_3$.

The manganese-containing composite oxide is an infrared-reflective inorganic pigment.

There is no particular limitation on the metal element(s) other than manganese, contained in the manganese-containing composite oxide. The metal element(s) may be appropriately selected e.g. from the viewpoint of obtaining a staid design with a lower brightness, or obtaining good heat-shielding properties.

The metal element(s) other than manganese may be used singly or in a combination of two or more thereof. Examples of the metal element(s) other than manganese include group-2 elements such as calcium and barium; group-3 elements such as yttrium, lanthanum, praseodymium and neodymium; group-4 elements such as titanium and zirconium; group-13 elements such as boron, aluminum, gallium and indium; and group-15 elements such as antimony and bismuth. Among them, the group-2 elements, the group-4 elements and the group-15 elements are preferred, calcium, titanium and bismuth are more preferred, and calcium and titanium are even more preferred.

A composite oxide containing manganese, calcium and titanium can be specifically exemplified as a particularly preferable manganese-containing composite oxide.

There is no particular limitation on the structure of the manganese-containing composite oxide. However, from the viewpoint of the stability, the heat-shielding properties, the design, etc. of the structure, a perovskite structure, an orthorhombic structure and a hexagonal crystal structure are preferred, and a perovskite structure is more preferred.

The manganese-containing composite oxide is described, for example, in WO 2016/125907 A1.

As the infrared-transparent or infrared-reflective inorganic pigment, an inorganic pigment other than the manganese-containing composite oxide and iron oxide may be included. Titanium oxide is an example of such an inorganic pigment.

The content of the infrared-transparent or infrared-reflective inorganic pigment in the solid printing layer is preferably 20 to 80% by mass, more preferably 40 to 80% by mass, even more preferably 60 to 80% by mass based on the solid content of the solid printing layer from the viewpoint of concealing the tint of the substrate and the viewpoint of a balance of the moldability of the decorative sheet.

When the solid printing layer contains a plurality of types of infrared-transparent or infrared-reflective inorganic pigments, the above-described pigment content refers to the total content of the infrared-transparent or infrared-reflective inorganic pigments.

The average particle size of the infrared-transparent or infrared-reflective inorganic pigment is preferably not less than 0.1 μm, more preferably not less than 0.2 μm from the viewpoint of enhancing light absorption in the visible light range. There is no particular limitation on the upper limit of the average particle size of the infrared-transparent or infrared-reflective inorganic pigment; however, from the viewpoint of making the design of the decorative layer more delicate, the upper limit is preferably 3.0 μm or less, more preferably 2.0 μm or less, and even more preferably 1.0 μm or less.

The average particle size, as used herein, is a value which can be determined as a mass average value D50 in the measurement of a particle size distribution by a laser diffraction method.

There is no particular limitation on the binder resin of the solid printing layer. Examples of preferable binder resins include a urethane resin, an acrylic polyol resin, an acrylic resin, an ester resin, an amide resin, a butyral resin, a styrene resin, a urethane-acrylate copolymer, a polycarbonate urethane-acrylate copolymer (a urethane-acrylate copolymer derived from a polymer (polycarbonate polyol) having a carbonate bond in the polymer main chain and having two or more hydroxyl groups at the end(s) or in a side chain(s)), a vinyl chloride-vinyl acetate copolymer resin, a vinyl chloride-vinyl acetate-acrylate copolymer resin, a chlorinated propylene resin, a nitrocellulose resin, and a cellulose acetate resin. These resins can be used singly or in a combination of two or more thereof. Besides a one-component curable resin, it is possible to use various other types of resins, including a two-component curable resin containing a curing agent, for example an isocyanate compound such as tolylene diisocyanate (TDI), diphenylmethane diisocyanate (MDI), hexamethylene diisocyanate (HDI), isophorone diisocyanate (IPID), or xylylene diisocyanate (XDI).

The solid printing layer may further contain an infrared-transparent or infrared-reflective organic pigment, for example to adjust the tint of the layer.

From the viewpoint of enhancing the weatherability, the solid printing layer and the below-described picture layer may contain a weathering agent such as an ultraviolet absorber or a light stabilizer. The ultraviolet absorber and the light stabilizer can be exemplified by the compounds described above as being usable for the substrate. From the viewpoint of enhancing the weatherability, the contents of the ultraviolet absorber and the light stabilizer may be exemplified by the same ranges as those in the surface protective layer described below.

The thickness of the solid printing layer is preferably 0.5 to 15 µm, more preferably 1 to 10 µm, and even more preferably 2 to 8 µm from the viewpoint of a balance between the concealing properties and the moldability.

The solid printing layer needs not be a so-called "full solid printing layer" which is formed on the entire area of the substrate. However, from the viewpoint of enhancing the substrate-concealing properties, the solid printing layer preferably covers not less than 90%, more preferably not less than 95%, even more preferably not less than 99%, and still more preferably 100% of the entire area of the substrate.

Preferably, from the viewpoint of the heat-shielding properties, the solid printing layer does not substantially contain carbon black. What is meant by "not substantially contain" is that the content of carbon black is not more than 0.1% by mass, preferably not more than 0.01% by mass, more preferably not more than 0.001% by mass, and even more preferably 0% by mass based on the total solid content of the solid printing layer. It is preferred that the below-described picture layer should not substantially contain carbon black either.

When the design given by the decorative layer is a wood grain pattern, the solid printing layer preferably exhibits a wood surface pattern (portions other than a vessel pattern and/or a knot pattern of the wood grain pattern). When the design given by the decorative layer is a stone pattern such as travertine, the solid printing layer preferably exhibits a pattern other than recessed portions. When the design given by the decorative layer is a tile pattern or a brick pattern, the solid printing layer preferably exhibits the tile portions or the brick portions.

The solid printing layer may be composed of a single layer, or a laminate of a plurality of solid printing layers.

<<Picture Layer>>

The picture layer contains at least three compounds selected from the organic pigment group consisting of a quinacridone, an isoindolinone, a nickel azo complex and a phthalocyanine, and a binder resin.

A dark color tone can be easily adjusted by the inclusion in the decorative layer of at least three compounds selected from the organic pigment group consisting of a quinacridone, an isoindolinone, a nickel azo complex and a phthalocyanine.

The quinacridone is a compound represented by the molecular formula $C_{20}H_{12}N_2O_2$. Examples of the quinacridone include C.I.Pigment Violet 19, C.I.Pigment Red 122, C.I.Pigment Red 209, C.I.Pigment Red 202, C.I.Pigment Orange 48, and C.I.Pigment Orange 49, which differ in the crystal structure.

The isoindolinone is a compound having an indolinone skeleton. Examples of the isoindolinone include C.I.Pigment Yellow 109, C.I.Pigment Yellow 110, C.I.Pigment Yellow 173, and C.I.Pigment Orange 61.

The nickel azo complex is a coordination compound in which nickel as an electron acceptor and an azo group as an electron donor are coordination-bonded. Examples of the nickel azo complex include C.I.Pigment Green 10 and C.I.Pigment Yellow 150.

The phthalocyanine is a cyclic compound having a structure in which four phthalic imide moieties are crosslinked by nitrogen atoms. Example of the phthalocyanine include non-metallic phthalocyanines such as C.I.Pigment Blue 16, and metallic phthalocyanines such as C.I.Pigment Blue 15, C.I.Pigment Blue 15:3, C.I.Pigment Blue 15:4, C.I.Pigment Blue 15:6, C.I.Pigment Green 7, and C.I.Pigment Green 36.

The at least three compounds selected from the above-described organic pigment group can be appropriately combined depending on the intended color, as exemplified by a combination of (i) a red pigment or an orange pigment, (ii) a yellow pigment or a green pigment and (iii) a blue pigment or a violet pigment.

Specific examples of organic pigment combinations include a combination of C.I.Pigment Red 122, C.I.Pigment Yellow 150 and C.I.Pigment Blue 15, a combination of C.I.Pigment Red 122, C.I.Pigment Yellow 109 and C.I.Pigment Blue 15, etc.

The picture layer can be formed, for example, by printing using a picture layer forming ink containing the at least three compounds selected from the above-described organic pigment group, and a binder resin. The picture layer may be formed by single color printing, or by multi-color printing using a plurality of inks containing different types and/or amounts of organic pigments. The picture layer may be composed of a single layer, or a laminate of a plurality of overlapping picture layers.

The content of the organic pigments in the picture layer is preferably 10 to 80% by mass, more preferably 12 to 50% by mass, even more preferably 15 to 30% by mass based on the solid content of the picture layer from the viewpoint of imparting dark color and the viewpoint of a balance the moldability of the decorative sheet.

The content of the organic pigments herein refers to the total content of the at least three compounds.

There is no particular limitation on the average particle size of the respective organic pigments. If the pigment particles have a common variance, the average particle size will be about 0.03 to 0.20 µm.

The same binder resin as the-above-described binder resin of the solid printing layer can be used as the binder resin of the picture layer.

From the viewpoint of enhancing the weatherability, the picture layer may contain a weathering agent such as an ultraviolet absorber or a light stabilizer.

The ultraviolet absorber and the light stabilizer can be exemplified by the compounds described above as being usable for the substrate. From the viewpoint of enhancing the weatherability, the contents of the ultraviolet absorber and the light stabilizer may be exemplified by the same ranges as those in the surface protective layer described below.

The thickness of the picture layer is preferably 0.5 to 20 µm, more preferably 1 to 10 µm, and even more preferably 2 to 8 µm or less from the viewpoint of a balance between the impartation of dark color and the moldability. When the picture layer is composed of multiple layers, the thickness a picture exhibiting each picture layer preferably lies in the above range.

There is no particular limitation on the type of the picture of the picture layer; however, since the picture is dark-colored, it is preferably a picture exhibiting recessed portions.

When the design given by the decorative layer is a wood grain pattern, the picture layer preferably exhibits a vessel pattern and/or a knot pattern. When the design given by the decorative layer is a stone pattern such as travertine, the picture layer preferably exhibits a pattern of recessed portions. When the design given by the decorative layer is a tile pattern or a brick pattern, the picture layer preferably exhibits a pattern of the joints.

In order to enhance the premium feel provided by dark color, the decorative sheet of the present invention preferably has an L* value of the CIE (International Commission on Illumination) L*a*b* color system, measured according to JIS Z8781-4:2013, of not more than 50, more preferably not more than 45 in an area which lies in the decorative layer-side surface of the decorative sheet and in which the solid printing layer and the picture layer exist.

<Additional Picture Layer>

The decorative sheet of the present invention may also include, as a decorative layer, an additional picture layer (a picture layer other than the picture layer containing at least three compounds selected from the organic pigment group consisting of a quinacridone, an isoindolinone, a nickel azo complex and a phthalocyanine, and a binder resin). From the viewpoint of exhibiting a dark-colored design, the decorative sheet preferably should not have an additional picture layer.

The additional picture layer can be exemplified by a picture layer containing one or two compounds selected from the organic pigment group consisting of a quinacridone, an isoindolinone, a nickel azo complex and a phthalocyanine, and a binder resin, and a picture layer containing an azomethine-azo pigment and a binder resin.

<Adhesive Layer A>

The decorative sheet may optionally include an adhesive layer A.

Especially when the decorative sheet includes the below-described transparent resin layer, the provision of the adhesive layer A is effective in enhancing the interlayer adhesion between the decorative layer and the transparent resin layer. Adhesives which are generally used for decorative sheets can be used, without any limitation, as an adhesive that constitutes the adhesive layer A.

Examples of usable adhesives include a urethane adhesive, an acrylic adhesive, an epoxy adhesive, and a rubber adhesive. Among them, a urethane adhesive is preferred in terms of adhesive force. The urethane adhesive can be exemplified by an adhesive using a two-component curable urethane resin containing a polyol compound such as a polyether polyol, a polyester polyol, an acrylic polyol or a polycarbonate diol, and any of curing agents such as isocyanate compounds as described above. In addition, an acrylate-polyester-vinyl acetate resin is also a preferable adhesive which can easily develop adhesiveness upon heating and can maintain adhesive strength during use at a high temperature.

From the viewpoint of obtaining a sufficient adhesiveness, the thickness of the adhesive layer A is preferably not less than 0.1 µm, more preferably not less than 1 µm, and even more preferably not less than 2 µm. The upper limit is preferably 20 µm or less, more preferably 10 µm or less.

<Transparent Resin Layer>

From the viewpoint of protecting the decorative layer and enhancing the weatherability and the surface properties such as scratch resistance, a transparent resin layer is preferably provided on the decorative layer either directly or via another layer. The transparent resin layer may be composed of a single layer, or two or more layers.

Examples of preferable transparent resin layer-constituting resins include a polyolefin resin, a polyester resin, an acrylic resin, a polycarbonate resin, a polyurethane resin, a polystyrene resin, a vinyl chloride resin, a vinyl acetate resin, and a fluororesin.

Among them, from the viewpoint of enhancing the weatherability and the surface properties such as scratch resistance, a polyolefin resin, a polyester resin and a fluororesin are preferred, and a polyolefin resin is particularly preferred. The polyolefin resin can be exemplified by the resins described above as being usable for the substrate. Among them, a polypropylene resin is preferred.

Examples of the fluororesin include polyvinyl fluoride, polyvinylidene fluoride, polytetrafluoroethylene, an ethylene-tetrafluoroethylene copolymer, and a tetrafluoroethylene-hexafluoropropylene copolymer. These resins may be used singly or as a mixture of two or more thereof.

The transparent resin layer containing a fluororesin preferably also contains an acrylic resin such as polymethyl (meth)acrylate, polybutyl (meth)acrylate, a methyl (meth)acrylate-butyl (meth)acrylate copolymer, or an ethylene-methyl (meth)acrylate copolymer.

When the transparent resin layer containing a fluororesin is used, it is preferred to laminate an additional transparent resin layer to the fluororesin-containing transparent resin layer to form a transparent resin layer having a multi-layer structure. The additional transparent resin layer is preferably disposed on the decorative-layer side.

The transparent resin layer may optionally contain an additive. The additive can be exemplified by the additives described above as being usable for the substrate. Among such additives, a weathering agent such as an ultraviolet absorber or a light stabilizer is preferably used.

The ultraviolet absorber and the light stabilizer can be exemplified by the compounds described above as being usable for the substrate. From the viewpoint of enhancing the weatherability, the contents of these weathering agents may be exemplified by the same ranges as those in the substrate described above.

The thickness of the transparent resin layer is preferably not less than 10 µm, more preferably not less than 30 µm, even more preferably not less than 50 µm from the viewpoint of protecting the decorative layer and enhancing the surface properties such as scratch resistance and weatherability. The upper limit is preferably 150 µm or less, more preferably 120 µm or less, even more preferably 100 µm or less from the viewpoint of handling of the decorative sheet. Further, from the viewpoint of protecting the decorative layer and obtaining excellent scratch resistance, the thickness of the transparent resin layer is preferably made equal to or larger than the thickness of the substrate.

One or both surfaces of the transparent resin layer may be subjected to a physical surface treatment using, for example, an oxidation method or a surface roughening method, or a chemical surface treatment, for example to enhance the interlayer adhesion between the transparent resin layer and another layer(s). The physical or chemical surface treatment can be exemplified by the same methods as those for the surface treatment of the substrate described above.

Further, in order to enhance the interlayer adhesion between the transparent resin layer and another layer(s), one or both surfaces of the transparent resin layer may be subjected to a treatment to form a primer layer which will be described later.

<Surface Protective Layer>

A surface protective layer is preferably provided on the decorative layer of the decorative sheet either directly or via another layer(s) (the adhesive layer A, the transparent resin layer, the primer layer) mainly from the viewpoint of enhancing the surface properties such as scratch resistance and weatherability.

The surface protective layer is formed of a cured product of a resin composition containing a curable resin.

Besides a thermosetting resin such as a two-component curable resin, an ionizing radiation-curable resin or the like is preferably used as the curable resin which is used for the formation of the surface protective layer. The curable resin may be of a so-called hybrid type which uses a combination of such resins, for example, a combination of an ionizing radiation-curable resin and a thermosetting resin, or a combination of a curable resin and a thermoplastic resin.

An ionizing radiation-curable resin is preferred as the curable resin from the viewpoints of increasing the cross-linking density of the resin constituting the surface protective layer and obtaining superior surface properties such as scratch resistance and weatherability. An electron beam-curable resin is more preferred from the viewpoint of easy handling.

<<Ionizing Radiation-Curable Resin>>

The ionizing radiation-curable resin is a resin which is capable of being crosslinked and cured upon irradiation with ionizing radiation and which has an ionizing radiation-curable functional group. The ionizing radiation-curable functional group herein refers to a group capable of being crosslinked and cured upon irradiation with ionizing radiation. A functional group having an ethylenic double bond, such as a (meth)acryloyl group, a vinyl group or an allyl group, is an exemplary preferable ionizing radiation-curable functional group. The ionizing radiation refers to electromagnetic radiation or charged particle radiation having an energy quantum that can polymerize or crosslink molecules. While ultraviolet (UV) radiation or electron beam (EB) radiation is generally used, electromagnetic radiation, such as an X-ray radiation or γ-ray radiation, or charged particle radiation, such as an α-ray radiation or ion beam radiation, may also be used.

A specific ionizing radiation-curable resin to be used can be appropriately selected from among polymerizable monomers and polymerizable oligomers which are conventionally used as ionizing radiation-curable resins.

A (meth)acrylate monomer having a radical-polymerizable unsaturated group in the molecule, in particular a polyfunctional (meth)acrylate monomer, is preferably used as a polymerizable monomer. As used herein, "(meth)acrylate" refers to "acrylate or methacrylate".

The polyfunctional (meth)acrylate monomer can be exemplified by a (meth)acrylate monomer having 2 or more ionizing radiation-curable functional groups in the molecule and having at least a (meth)acryloyl group as the functional group. From the viewpoint of obtaining superior surface properties such as scratch resistance and weatherability, an acrylate monomer having an acryloyl group is preferred.

From the viewpoint of obtaining superior surface properties such as scratch resistance and weatherability, the number of the functional groups is preferably not less than 2. The upper limit is preferably 8 or less, more preferably 6 or less, even more preferably 4 or less, and particularly preferably 3 or less. These polyfunctional (meth)acrylate monomers may be used singly or in a combination of two or more.

The polymerizable oligomer can be exemplified by a (meth)acrylate oligomer having 2 or more ionizing radiation-curable functional groups in the molecule and having at least a (meth)acryloyl group as the functional group. Examples of the (meth)acrylate oligomer include a urethane (meth)acrylate oligomer, an epoxy (meth)acrylate oligomer, a polyester (meth)acrylate oligomer, a polyether (meth)acrylate oligomer, a polycarbonate (meth)acrylate oligomer, and an acrylic (meth)acrylate oligomer.

Examples of the polymerizable oligomer further include a highly hydrophobic polybutadiene (meth)acrylate oligomer having a (meth)acrylate group in a side chain of a polybutadiene oligomer, a silicone (meth)acrylate oligomer having a polysiloxane bond in the main chain; an aminoplast resin (meth)acrylate oligomer obtained by modifying an aminoplast resin having a number of reactive groups in the small molecule, and an oligomer having a cation-polymerizable functional group in the molecule such as a novolak epoxy resin, a bisphenol epoxy resin, an aliphatic vinyl ether, an aromatic vinyl ether, or the like.

These polymerizable oligomers may be used singly or in a combination of two or more thereof. From the viewpoint of obtaining superior surface properties such as scratch resistance and weatherability, a urethane (meth)acrylate oligomer, an epoxy (meth)acrylate oligomer, a polyester (meth)acrylate oligomer, a polyether (meth)acrylate oligomer, a polycarbonate (meth)acrylate oligomer, and an acrylic (met)acrylate oligomer are preferred, and a urethane (meth)acrylate oligomer and a polycarbonate (meth)acrylate oligomer are more preferred.

From the viewpoint of obtaining superior surface properties such as scratch resistance and weatherability, the number of functional groups of each of the polymerizable oligomers is preferably not less than 2. The upper limit is preferably 8 or less, more preferably 6 or less, even more preferably 4 or less, and still more preferably 3 or less.

From the viewpoint of obtaining superior surface properties such as scratch resistance and weatherability, the weight-average molecular weight of each of the polymerizable oligomer is preferably not less than 2,500, more preferably not less than 3,000, and even more preferably not less than 3,500. The upper limit is preferably 15,000 or less, more preferably 12,500 or less, and even more preferably 11,000 or less. The weight-average molecular weight herein refers to an average molecular weight which is measured by GPC analysis and calculated in terms of standard polystyrene.

In order to reduce the viscosity of the ionizing radiation-curable resin, a monofunctional (meth)acrylate can be appropriately used together with the above-described polyfunctional (meth)acrylate. It is also possible to use a combination of two or more types of monofunctional (meth)acrylates.

The ionizing radiation-curable resin preferably contains the polymerizable oligomer from the viewpoint of enhancing the surface properties such as scratch resistance and weatherability. The content of the polymerizable oligomer in the ionizing radiation-curable resin is preferably not less than 80% by mass, more preferably not less than 90% by mass, even more preferably not less than 95% by mass, and still more preferably 100% by mass.

The curable resin composition constituting the surface protective layer preferably contains an ultraviolet absorber. When the surface protective layer contains the ultraviolet absorber, the ultraviolet absorber can be held stably in the surface protective layer. This ensures excellent weatherability of the decorative sheet even when used in a severe environment.

The ultraviolet absorber can be exemplified by a benzotriazole ultraviolet absorber, a benzophenone ultraviolet absorber and a triazine ultraviolet absorber, which have been described above as ultraviolet absorbers usable in the substrate. Among them, a triazine ultraviolet absorber is preferred.

The curable resin composition constituting the surface protective layer preferably contains a light stabilizer from the viewpoint of enhancing the weatherability. A hindered amine light stabilizer is preferably used as the light stabilizer, and can be exemplified by the light stabilizers described above as being usable for the substrate. A hindered amine light stabilizer derived from decanedioic acid (sebacic acid) is preferred from the viewpoint of weatherability.

Such ultraviolet absorbers or light stabilizers can be used singly or in a combination of two or more thereof in the surface protective layer. The ultraviolet absorber or the light stabilizer may be one having a reactive functional group with an ethylenic double bond, such as a (meth)acryloyl group, a vinyl group or an allyl group. Such an ultraviolet absorber or light stabilizer is unlikely to bleed out due to interaction with the curable resin constituting the surface protective layer, and therefore can be used in a larger amount, resulting in superior weatherability of the decorative sheet.

The content of the ultraviolet absorber in the surface protective layer is preferably not less than 0.1 parts by mass, more preferably not less than 0.2 parts by mass, even more preferably not less than 0.3 parts by mass, and still more preferably not less than 0.5 parts by mass based on 100 parts by mass of the curable resin constituting the surface protective layer. The upper limit is preferably 20 parts by mass or less, more preferably 10 parts by mass or less.

The content of the light stabilizer in the surface protective layer is preferably not less than 0.1 parts by mass, more preferably not less than 0.5 parts by mass, even more preferably not less than 1 part by mass, and still more preferably not less than 1.5 parts by mass based on 100 parts by mass of the curable resin constituting the surface protective layer. The upper limit is preferably 10 parts by mass or less, more preferably 8 parts by mass or less, even more preferably 5 parts by mass or less, and still more preferably 3 parts by mass or less. When the content of the ultraviolet absorber or the light stabilizer in the surface protective layer lies within the above range, the additive is unlikely to bleed out and can therefore achieve a full effect.

Besides the ultraviolet absorber and the light stabilizer, the surface protective layer may also contain an additive(s) such as an ultraviolet blocking agent, an abrasion-resistance enhancer, a polymerization inhibitor, a crosslinking agent, an antistatic agent, an adhesion improver, a levelling agent, a thixotropy-imparting agent, a coupling agent, a plasticizer, a defoamer, a filler, a blocking inhibitor, a lubricant, and a solvent as long as the use of the additive(s) does not depart from the object of the present invention.

From the viewpoint of enhancing the surface properties such as scratch resistance and weatherability, the thickness of the surface protective layer is preferably not less than 2 μm, more preferably not less than 3 μm, and even more preferably not less than 4 μm. From the viewpoint of preventing cracking of the surface protective layer upon molding of the decorative sheet, the thickness of the surface protective layer is preferably not more than 15 μm, more preferably not more than 10 μm, and even more preferably not more than 8 μm.

<Primer Layer>

The decorative sheet may optionally include a primer layer. The primer layer is provided mainly to enhance interlayer adhesion. In the case where the primer layer is provided on the opposite side of the substrate from the surface protective layer (such a primer layer is also referred to as a "backside primer layer"), the primer layer can enhance the interlayer adhesion between the substrate and an adherend.

The primer layer may be provided in at least one position selected from a position between the substrate and the decorative layer, a position between the adhesive layer A and the transparent resin layer, a position between the transparent resin layer and the surface protective layer, and a position on the subface of the substrate on the side opposite to the decorative layer.

A resin composition, obtained by appropriately mixing a binder, a curing agent, a weathering agent(s) such as an ultraviolet absorber and a light stabilizer, and an additive(s) such as a blocking inhibitor, can be used for the formation of the primer layer.

The binder can be preferably exemplified by the resins described above as binders usable for the solid printing layer. Such resins can be used singly or in a combination of two or more thereof. For example, a mixture of a polycarbonate urethane-acrylate copolymer and an acrylic polyol resin can be used as the binder.

Besides a one-component curable resin, it is possible to use various other types of resins, including a two-component curable resin containing a curing agent, for example an isocyanate compound such as tolylene diisocyanate (TDI), diphenylmethane diisocyanate (MDI), hexamethylene diisocyanate (HDI), isophorone diisocyanate (IPID), or xylylene diisocyanate (XDI).

From the viewpoint of enhancing the weatherability, the primer layer preferably contains a weathering agent such as an ultraviolet absorber or a light stabilizer. The ultraviolet absorber and the light stabilizer can be exemplified by the compounds described above as being usable for the substrate.

The content of the ultraviolet absorber in the primer layer is preferably not less than 1 part by mass, more preferably not less than 5 parts by mass, even more preferably not less than 10 parts by mass based on 100 parts by mass of the resin constituting the primer layer. The upper limit is preferably 40 parts by mass or less, more preferably 30 parts by mass or less, and even more preferably 25 parts by mass or less.

The content of the light stabilizer in the primer layer is preferably not less than 0.5 parts by mass, more preferably not less than 1 part by mass, even more preferably not less than 1.5 parts by mass, and still more preferably not less than 2 parts by mass based on 100 parts by mass of the resin constituting the primer layer. The upper limit is preferably 20 parts by mass or less, more preferably 15 parts by mass or less, even more preferably 10 parts by mass or less, and still more preferably 8 parts by mass or less.

When the content of the ultraviolet absorber or the light stabilizer in the primer layer lies within the above range, the primer layer can have excellent primer characteristics and excellent weatherability.

From the viewpoint of enhancing interlayer adhesion and reducing the thermal contraction of each layer, the thickness of the primer layer is preferably not less than 1 µm, more preferably not less than 2 µm, and even more preferably not less than 3 µm. The upper limit is preferably 10 µm or less, more preferably 8 µm or less, and even more preferably 6 µm or less.

The decorative sheet may have surface irregularities formed, for example, by an embossing process.

The embossing process can be performed by heating the decorative sheet preferably at a temperature of not less than 80° C. and not more than 260° C., more preferably not less than 85° C. and not more than 160° C., even more preferably not less than 100° C. and not more than 140° C., and pressing an embossing plate against the decorative sheet. The embossing plate is preferably pressed against the decorative layer-side surface of the substrate of the decorative sheet.

The decorative sheet of the present invention can be used as a decorative sheet for an architectural member or structure such as a floor, a wall, a window, a door, a handrail, a fence, a railing or floor grates; a part or component of a vehicle such as an automobile, e.g. a dashboard, a glove box, an instrument panel upper case, a center console or a floor console; and so forth. In particular, the decorative sheet of the present invention can be advantageously used as a decorative sheet for a window frame which suffers from the problem of heat generation caused by sunlight irradiation, or an interior part or component of a vehicle such as an automobile.

[Decorative Material]

The decorative material of the present invention includes an adherend and the above-described decorative sheet of the present invention. More specifically, the decorative material is a laminate of the adherend and the decorative sheet, in which the surface of the adherend on the side that requires decoration faces the substrate-side surface of the decorative sheet.

<Adherend>

The adherend can be exemplified by plates, such as flat plates or curved plates, made of a variety of materials, an article having a three-dimensional shape, and a sheet (or a film). Specific examples may include a wood member for use as an article having a three-dimensional shape or as a plate material such as a single wood plate, a plywood plate, a particle board or a wood fiberboard, e.g. an MDF (medium-density fiberboard), made of a variety of woods such as Japanese cedar, Japanese cypress, pine, and lauan; a metal member for use as a plate material of iron, aluminum, or the like, a steel plate, an article having a three-dimensional shape, or a sheet; a ceramic member for use as a plate member or an article having a three-dimensional shape, made of glass, ceramics such as pottery, a non-cement ceramic material such as gypsum, or a non-pottery ceramic material such as ALC (autoclaved lightweight concrete); and a resin member for use as a plate material, an articles having a three-dimensional shape or a sheet, e.g. made of an acrylic resin, a polyester resin, a polystyrene resin, a polyolefin resin such as polypropylene, an ABS (acrylonitrile-butadiene-styrene copolymer) resin, a phenol resin, a vinyl chloride resin, a cellulose resin, or a rubber. These members can be used singly or in a combination of two or more thereof.

While the thickness of the adherend may be appropriately selected depending on the intended use and the material, it is preferably not less than 0.1 mm and not more than 10 mm, more preferably not less than 0.3 mm and not more than 5 mm, and even more preferably not less than 0.5 mm and not more than 3 mm.

<Adhesive Layer B>

In order to obtain excellent adhesion between an adherend and the decorative sheet, they are preferably attached to each other via an adhesive layer B.

There is no particular limitation on an adhesive to be used for the adhesive layer B, and known adhesives can be used. For example, a heat-sensitive adhesive or a pressure-sensitive adhesive can be preferably used. Examples of resins which are usable for the adhesive constituting the adhesive layer B include an acrylic resin, a polyurethane resin, a vinyl chloride resin, a vinyl acetate resin, a vinyl chloride-vinyl acetate copolymer resin, a styrene-acrylate copolymer resin, a polyester resin, and a polyamide resin. These resins can be used singly or in a combination of two or more thereof. A two-component curable polyurethane or polyester adhesive, using an isocyanate compound or the like as a curing agent, can also be used.

A gluing agent may also be used for the adhesive layer B. An acrylic, urethane, silicone or rubber gluing agent can be appropriately selected and used.

While there is no particular limitation on the thickness of the adhesive layer B, it is preferably not less than 1 µm and not more than 100 µm, more preferably not less than 5 µm and not more than 50 µm, and even more preferably not less than 10 µm and not more than 30 µm from the viewpoint of obtaining excellent adhesiveness.

<Decorative Material Production Method>

The decorative material can be produced through a process of laminating the decorative sheet and an adherend together.

The process involves laminating an adherend and the decorative sheet of the present invention, with the surface of the adherend on the side that requires decoration facing the substrate-side surface of the decorative sheet. As a method of laminating the adherend and the decorative sheet, for example, there is a lamination method which includes pressing and laminating the decorative sheet onto the adherend in a plate-like shape via the adhesive layer B by using a pressure roller.

In the case of using a hot-melt adhesive (heat-sensitive adhesive) as the adhesive, the heating temperature is preferably not less than 160° C. and not more than 200° C., though it may vary depending on the type of the resin constituting the adhesive. In the case of using a reactive hot-melt adhesive, the heating temperature is preferably not less than 100° C. and not more than 130° C. When the process is performed by vacuum forming, the process is generally carried out while heating the decorative sheet and the adherend preferably at a temperature of not less than 80° C. and not more than 130° C., more preferably not less than 90° C. and not more than 120° C.

The thus-obtained decorative material can be used as an architectural member or structure such as a floor, a wall, a window, a door, a handrail, a fence, a railing or floor grates; a part or component of a vehicle such as an automobile, e.g. a dashboard, a glove box, an instrument panel upper case, a center console or a floor console; and so forth. In particular, the decorative material of the present invention can be advantageously used as an interior or exterior decorative material, such as a decorative material for a window frame which suffers from the problem of heat generation caused by sunlight irradiation, or a decorative material for an interior or exterior part or component of a vehicle such as an automobile.

EXAMPLES

The following examples illustrate the present invention in greater detail and are not intended to limit the scope of the invention.

1. Measurement and Evaluation 1-1. Heat-Shielding Properties

Using a 200 W lamp (incandescent lamp manufacture by Iwasaki Electric Co., Ltd.), decorative materials obtained in Examples and Comparative Examples were irradiated with light, emitted from a height of 30 cm, under the conditions of room temperature (23° C.) and a relative humidity of 50%, and 10 minutes later, the surface temperature of each decorative sheet was measured, and evaluated by the following criteria:

A: the surface temperature was less than 75° C.
B: the surface temperature was not less than 75° C. and less than 85° C.
C: the surface temperature was not less than 85° C. and less than 95° C.
D: the surface temperature was not less than 95° C.

1-2. Concealing Properties

Reference decorative sheets were prepared by changing each of the substrates of the decorative sheets of Examples 1 and 2 and Comparative Examples 1 to 4 to a black-colored polypropylene sheet substrate (having a thickness of 60 μm, and containing 5 parts by mass of titanium oxide, 5 parts by mass of iron oxide and 0.1 parts by mass of carbon black based on 100 parts by mass of a random polypropylene resin). The decorative sheets of the Examples and the Comparative Examples were compared to the reference decorative sheets under a fluorescent light, and were evaluated in the following manner: if the perceived tint of the decorative layer of a decorative sheet was the same as that of the reference sheet, the decorative sheet was rated as "A"; if the perceived tint of the decorative layer of a decorative sheet was different from that of the reference sheet, the decorative sheet was rated as "C"; and neither A nor C as "B".

1-3. Adjustment of Dark Color

Based on the dark color of each of the decorative layers formed from the solid printing layer forming inks and the picture layer forming inks of Examples 1 and 2 and Comparative Examples 1 to 4, a modified decorative layer having a different brightness, a different hue and a different saturation was formed through adjustment of the composition(s) of the corresponding solid printing layer forming ink and/or the corresponding picture layer forming ink, and the ease of the formation of the modified decorative layer was evaluated in the following manner: if the modified decorative layer having a different brightness, a different hue and a different saturation was formed easily without difficulty through the adjustment of the inks, the corresponding decorative sheet was rated as "A"; if the modified decorative layer having a different brightness, a different hue and a different saturation was formed with difficulty through the adjustment of the inks, the corresponding decorative sheet was rated as "C"; and neither A nor C as "B".

2. Production of Decorative Sheets and Decorative Materials

Example 1

A white polypropylene sheet (having a thickness of 60 μm, containing 10 parts by mass of titanium oxide based on 100 parts by mass of a random polypropylene resin, and having an average spectral reflectivity of 40% in the wavelength range of 780 to 2500 nm) was prepared as an infrared-reflective substrate. A solid printing layer forming ink 1 having the following formulation was applied by gravure coating to one surface of the sheet, followed by drying to form a solid printing layer (with a wood surface pattern) having a thickness of 4 μm.

<Solid Printing Layer Forming Ink 1>

| | |
|---|---|
| Binder resin (acrylic urethane resin) | 30 parts by mass |
| Infrared-reflective pigment ($TiO_2$) (average particle size: 0.2 μm) | 56 parts by mass |
| Infrared-transparent pigment (FeOOH) (average particle size: 0.1 μm) | 8 parts by mass |
| Infrared-transparent pigment ($Fe_2O_3$) (average particle size: 0.1 μm) | 5 parts by mass |
| Blue pigment (C.I. Pigment Blue 15) (average particle size: 0.04 μm) | 1 part by mass |
| Diluting solvent | q.s. |

Next, a picture layer forming ink 1 having the following formulation was applied by gravure coating onto the solid printing layer, followed by drying to form a picture layer (with a vessel pattern) having a thickness of 7 μm, thereby forming a decorative layer having a wood grain pattern and including of the solid printing layer and the picture layer.

<Picture Layer Forming Ink 1>

| | |
|---|---|
| Binder resin (acrylic urethane resin) | 76 parts by mass |
| Red pigment (C.I. Pigment Red 122) (average particle size: 0.13 μm) | 10 parts by mass |
| Yellow pigment (C.I. Pigment Yellow 150) (average particle size: 0.05 μm) | 9 parts by mass |
| Blue pigment (C.I. Pigment Blue 15) (average particle size: 0.04 μm) | 5 parts by mass |
| Diluting solvent | q.s. |

Next, an adhesive layer (polyester resin, thickness: 5 μm) was formed on the picture layer, and a transparent resin layer (transparent polypropylene resin, thickness: 80 μm) was laminated to the adhesive layer by an extrusion lamination method.

Next, the surface of the transparent resin layer was subjected to a corona discharge treatment, and then a two-component curable urethane resin composition was applied to the surface of the transparent resin layer to form a primer layer (thickness: 2 μm).

Next, a surface protective layer forming ink having the following formulation was applied onto the primer layer by roll coating, and the coating was irradiated with electron beam by using an electron beam irradiation apparatus under the conditions of: oxygen concentration 200 ppm; acceleration voltage 175 KeV; and irradiance level 5 Mrad, thereby curing the ionizing radiation-curable resin composition to form a surface protective layer having a thickness of 3 μm. A decorative sheet of Example 1 was thus produced.

Surface Protective Layer Forming Ink

| | |
|---|---|
| Trifunctional urethane-acrylate oligomer (weight-average molecular weight 5000) | 100 parts by mass |
| Inorganic filler (silica particles, average particle size: 5 μm) | 25 parts by mass |

A coated steel plate (thickness: 0.4 mm), to which an adhesive composed of a two-component curable urethane resin had been applied, was placed in an oven and cured at 150° C. for one minute. Immediately thereafter, the coated steel and the above decorative sheet were bonded together by using a roll laminator to obtain a decorative sheet of Example 1. The bonding was performed with the adhesive coating-side surface of the coated steel plate facing the white polypropylene sheet-side surface of the decorative sheet.

The above evaluations were made on the decorative sheet and the decorative material obtained. The evaluation results are shown in Table 1 below.

Example 2

A decorative sheet and a decorative material of Example 2 were produced in the same manner as in Example 1 except for changing the solid printing layer forming ink 1 to a solid printing layer forming ink 2 having the following formulation, and changing the picture layer forming ink 1 to a picture layer forming ink 2 having the following formulation.

Solid Printing Layer Forming Ink 2

| | |
|---|---|
| Binder resin (acrylic urethane resin) | 30 parts by mass |
| Infrared-reflective pigment (TiO$_2$) | 50 parts by mass |
| Infrared-transparent pigment (FeOOH) (average particle size: 0.1 μm) | 9 parts by mass |
| Infrared-transparent pigment (Fe$_2$O$_3$) (average particle size: 0.1 μm) | 6 parts by mass |
| Infrared-reflective pigment (composite oxide containing manganese, calcium and titanium as metal elements) (black pigment MPT-370 manufacture by Ishihara Sangyo Kaisha Ltd., average primary particle size 0.8 μm) | 5 parts by mass |
| Diluting solvent | q.s. |

Picture Layer Forming Ink 2

| | |
|---|---|
| Binder resin (acrylic urethane resin) | 80 parts by mass |
| Red pigment (C.I. Pigment Red 122) (average particle size: 0.13 μm) | 6 parts by mass |
| Yellow pigment (C.I. Pigment Yellow 150) (average particle size: 0.05 μm) | 9 parts by mass |
| Blue pigment (C.I. Pigment Blue 15) (average particle size: 0.04 μm) | 5 parts by mass |
| Diluting solvent | q.s. |

Comparative Example 1

A decorative sheet and a decorative material of Comparative Example 1 were produced in the same manner as in Example 1 except for changing the solid printing layer forming ink 1 to a solid printing layer forming ink 3 having the following formulation, and changing the picture layer forming ink 1 to a picture layer forming ink 3 having the following formulation.

Solid Printing Layer Forming Ink 3

| | |
|---|---|
| Binder resin (acrylic urethane resin) | 76 parts by mass |
| Red pigment (C.I. Pigment Red 122) (average particle size: 0.13 μm) | 10 parts by mass |
| Yellow pigment (C.I. Pigment Yellow 150) (average particle size: 0.05 μm) | 9 parts by mass |
| Blue pigment (C.I. Pigment Blue 15) (average particle size: 0.04 μm) | 5 parts by mass |

Picture Layer Forming Ink 3

| | |
|---|---|
| Binder resin (acrylic urethane resin) | 80 parts by mass |
| Red pigment (C.I. Pigment Red 122) (average particle size: 0.13 μm) | 6 parts by mass |
| Yellow pigment (C.I. Pigment Yellow 150) (average particle size: 0.05 μm) | 9 parts by mass |
| Black pigment (azomethine-azo pigment) (average particle size: 0.2 μm) | 5 parts by mass |
| Diluting solvent | q.s. |

Comparative Example 2

A decorative sheet and a decorative material of Comparative Example 2 were produced in the same manner as in Example 1 except for changing the solid printing layer forming ink 1 to a solid printing layer forming ink 4 having the following formulation.

Solid Printing Layer Forming Ink 4

| | |
|---|---|
| Binder resin (acrylic urethane resin) | 80 parts by mass |
| Red pigment (C.I. Pigment Red 122) (average particle size: 0.13 μm) | 6 parts by mass |
| Yellow pigment (C.I. Pigment Yellow 150) (average particle size: 0.05 μm) | 9 parts by mass |
| Black pigment (azomethine-azo pigment) (average particle size: 0.2 μm) | 5 parts by mass |
| Diluting solvent | q.s. |

Comparative Example 3

A decorative sheet and a decorative material of Comparative Example 3 were produced in the same manner as in Example 1 except for changing the picture layer forming ink 1 to a picture layer forming ink 4 having the following formulation.

Picture Layer Forming Ink 4

| | |
|---|---|
| Binder resin (acrylic urethane resin) | 80 parts by mass |
| Red pigment (C.I. Pigment Red 122) (average particle size: 0.13 μm) | 6 parts by mass |
| Yellow pigment (C.I. Pigment Yellow 150) (average particle size: 0.05 μm) | 9 parts by mass |
| Black pigment (carbon black) | 5 parts by mass |
| Diluting solvent | q.s. |

Comparative Example 4

A decorative sheet and a decorative material of Comparative Example 4 were produced in the same manner as in Example 1 except for changing the solid printing layer forming ink 1 to the above-described solid printing layer forming ink 4, and changing the picture layer forming ink 1 to the above-described picture layer forming ink 4.

TABLE 1

|  | Example 1 | Example 2 | Comp. Example 1 | Comp. Example 2 | Comp. Example 3 | Comp. Example 4 |
|---|---|---|---|---|---|---|
| Heat-shielding properties | A | A | A | A | D | D |
| Concealing properties | A | A | C | C | A | B |
| Adjustment of dark color | A | A | C | B | A | A |

The results in Table 1 verify that the decorative sheets of the Examples are excellent in the heat-shielding properties and in the substrate-concealing properties, and can easily adjust a dark color tone. With reference to the adjustment of a dark color tonen, specifically, each of the decorative sheets of Comparative Examples 1 and 2, in its solid printing layer forming ink or picture layer forming ink, contains the azomethine-azo pigment which has poor coloring power, and does not contain a compensating inorganic dark-colored pigment in any of the inks. Therefore, adjustment of a dark color tone cannot be made with ease on the comparative decorative sheets.

INDUSTRIAL APPLICABILITY

The decorative sheet of the present invention has excellent heat-shielding properties and excellent substrate-concealing properties, and enables easy adjustment of a dark color tone. Therefore, the decorative sheet of the present invention is useful as a decorative sheet for an architectural member or structure such as a floor, a wall, a window, a door, a handrail, a fence, a railing or floor grates; a part or component of a vehicle such as an automobile, e.g. a dashboard, a glove box, an instrument panel upper case, a center console or a floor console; and so forth. In particular, the decorative sheet of the present invention is extremely useful as a decorative sheet for a window frame which suffers from the problem of heat generation caused by sunlight irradiation, or an interior part or component of a vehicle such as an automobile.

REFERENCE SIGNS LIST

10: substrate
21: solid printing layer
22: picture layer
20: decorative layer
30: transparent resin layer
40: surface protective layer
100: decorative sheet

The invention claimed is:

1. A decorative sheet comprising an infrared-reflective substrate, and a decorative layer disposed on the infrared-reflective substrate and including a solid printing layer and a picture layer, wherein the solid printing layer contains an infrared-transparent or infrared-reflective inorganic pigment and a binder resin, and the picture layer contains a dark color tone, wherein the dark color tone is adjusted by the inclusion of combination of pigments consisting of a nickel azo complex and at least two compounds selected from the organic pigment group consisting of a quinacridone, an isoindolinone and a phthalocyanine, and a binder resin.

2. The decorative sheet according to claim 1, wherein the solid printing layer contains the infrared-transparent or infrared-reflective inorganic pigment in an amount of 20 to 80% by mass based on the solid content of the solid printing layer.

3. The decorative sheet according to claim 1, wherein the infrared-transparent or infrared-reflective inorganic pigment contains at least one compound selected from iron oxide and a manganese-containing composite oxide, wherein the manganese-containing composite oxide comprises manganese and at least one metal element other than manganese.

4. The decorative sheet according to claim 1, wherein the thickness of the solid printing layer is 0.5 to 15 μm.

5. The decorative sheet according to claim 1, wherein the picture layer contains the organic pigments in an amount of 10 to 80% by mass based on the solid content of the picture layer.

6. The decorative sheet according to claim 1, wherein the thickness of the picture layer is 0.5 to 20 μm.

7. The decorative sheet according to claim 1, wherein the infrared-reflective substrate contains titanium oxide.

8. The decorative sheet according to claim 1, further comprising at least one of a transparent resin layer and a protective layer, disposed on the decorative layer.

9. The decorative sheet according to claim 1, wherein the decorative sheet has an L* value of the CIE (International Commission on Illumination) L*a*b* color system, measured according to JIS Z8781-4:2013, of not more than 50 in an area which lies in the decorative layer-side surface of the decorative sheet and in which the solid printing layer and the picture layer exist.

10. The decorative sheet according to claim 1, wherein infrared-reflective substrate contains an infrared-reflective inorganic pigment and a binder resin, and the content of the infrared-reflective pigment in the infrared-reflective substrate is not less than 1 part by mass and not more than 20 parts by mass based on 100 parts by mass of the binder resin.

11. The decorative sheet according to claim 1, wherein the solid printing layer contains the infrared-transparent or infrared-reflective inorganic pigment in an amount of 40 to 80% by mass based on the solid content of the solid printing layer.

12. The decorative sheet according to claim 1, wherein the picture layer contains the organic pigments in an amount of 12 to 50% by mass based on the solid content of the picture layer.

13. A decorative material comprising an adherend and the decorative sheet according to claim 1.

* * * * *